D. T. BROWNLEE.
VEHICLE SPRING AND MOUNTING THEREFOR.
APPLICATION FILED AUG. 4, 1919.

1,364,701.

Patented Jan. 4, 1921.

WITNESS:
Max R. Felske
F. M. Roeder

INVENTOR:
Dalmar T. Brownlee,
BY
E. T. Silvius,
ATTORNEY.

UNITED STATES PATENT OFFICE.

DALMAR T. BROWNLEE, OF INDIANAPOLIS, INDIANA.

VEHICLE-SPRING AND MOUNTING THEREFOR.

1,364,701.  Specification of Letters Patent.  Patented Jan. 4, 1921.

Application filed August 4, 1919. Serial No. 315,221.

*To all whom it may concern:*

Be it known that I, DALMAR T. BROWNLEE, a citizen of the United States, residing at Indianapolis, in the county of Marion and State of Indiana, have invented a new and useful Vehicle-Spring and Mounting Therefor, of which the following is a specification, reference being had to the accompanying drawings and to the letters and figures of reference marked thereon.

This invention relates to vehicle springs of the type that is designed to insure a high degree of spring action, especially when the vehicles are operating on rough roads, the invention having reference more particularly to springs and mountings therefor of the type that is suitable for automobiles or motor vehicles to afford steady support for the vehicle body on its axles, and to absorb or prevent shocks to the vehicle body during operation on rough or uneven roads, and more especially at high speeds.

An object of the invention is to provide improved springs and mountings or connections therefor which shall be of such construction as to be adapted to be used in available spaces which may be too restricted to accommodate well known high grade and elaborate systems of springs.

Another object is to provide improved springs and mountings therefor which shall be adapted for use in the construction of automobiles or other vehicles, to give easy riding qualities to the vehicle and to prevent rebound action on uneven roads from affecting the vehicle body.

A further object is to provide improved compound springs for vehicles which shall be so constructed as to tend to prevent the breaking of the springs and also have the qualities of shock absorbers.

A still further object is to provide improved spring devices of such construction as to be adapted to be applied to vehicles having half-elliptic springs that are supported at their ends; an aim being to provide auxiliary springs and mountings of compact and inexpensive construction that shall be adapted to be inexpensively applied to motor vehicles already in use, and in a convenient manner without material alteration of the vehicle.

With the above-mentioned and other objects in view, the invention consists in improved springs and mountings therefor, including a novel and useful arrangement of springs, and further, in the novel parts and in the combinations and arrangements of parts, as hereinafter particularly described and further defined in the accompanying claims.

Figure 1:
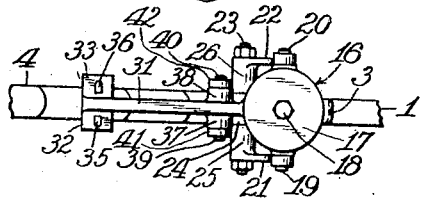
Figure 2:
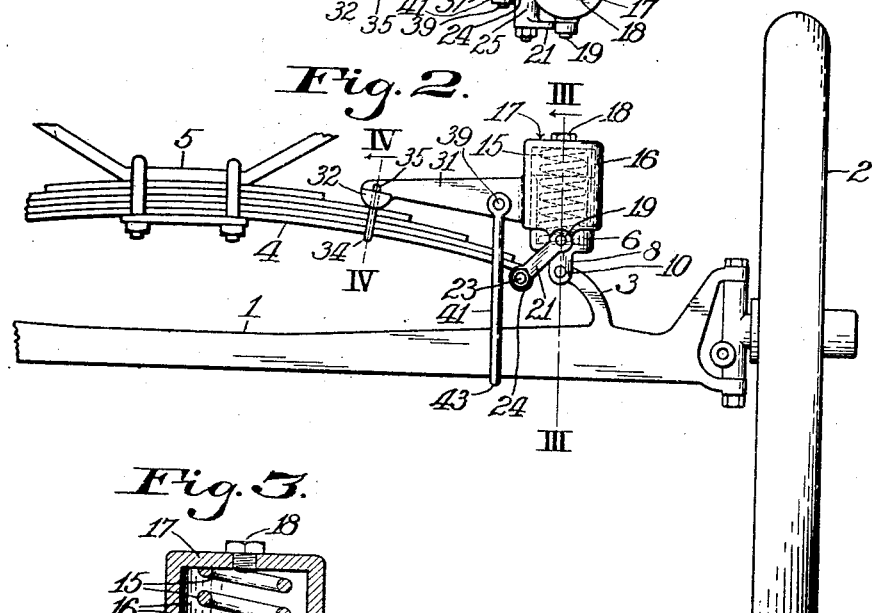
Figure 3:
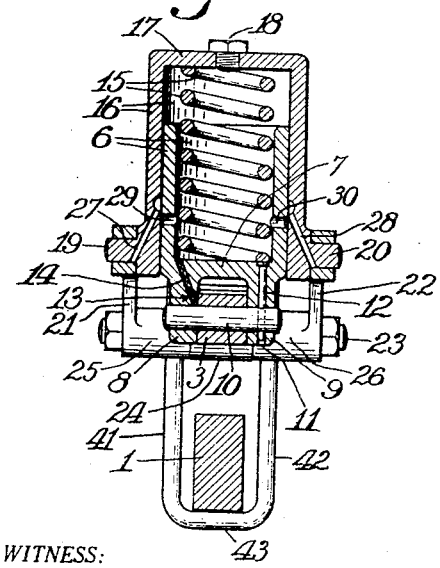
Figure 4:
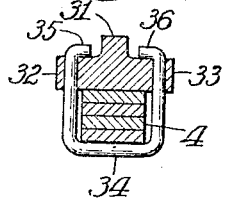

Referring to the drawings,—Figure 1 is a top plan illustrating one arrangement of the invention as applied to a motor vehicle; Fig. 2 is a fragmentary elevation of the forward axle of the motor vehicle having the invention applied thereto; Fig. 3 is a section approximately on the line III—III in Fig. 2; and, Fig. 4 is a section on the line IV—IV in Fig. 2.

Similar reference characters in the different figures of the drawings indicate corresponding elements or features of construction herein referred to in detail.

The invention is illustrated and described in one of its useful applications in connection with a motor vehicle of familiar construction which has a forward axle 1 and carrying wheels 2, of which only one is shown as being sufficient to an understanding of the invention, the axle having an arm 3 thereon whereby to support the leaf spring 4 of half-elliptic type which on its middle portion supports a part 5 of the vehicle body or frame in a well known manner. As is well known, it has been the practice hitherto to support the end portion of the spring on the supporting arm 3 by means of shackles or links. In the present case the leaf spring is conveniently provided with an auxiliary spring; and, without being limited to the particular leaf spring illustrated, the invention contemplates the compounding of springs to realize the maximum efficiency in spring action with such arrangement of spring elements as may be required or desired.

As illustrated, the invention includes a spring seat which preferably is pivoted and provided with a guide, a hollow cylindrical guide 6 being preferred, at the lower end of which is a spring seat 7 having on its outside two pivot ears 8 and 9 provided with a pivot 10 by which the ears are connected to the arm 3 of the axle and supported thereon, the guide having an open top. One of the pivot ears has a pin hole 11 therein that extends through the spring seat and receives a retaining pin 12 that extends through and secures the pivot 10 in place. The opposite ear has an oilway 13 that extends through the spring seat and to the pivot adjacent to the arm 3 and preferably contains a feed-wick 14. A coil spring 15 is supported at one end upon the spring seat 7 and extends upward beyond the guide 6. A suitable hanger is provided whereby to support the end of the leaf spring on the coil spring and preferably comprises a hollow cylinder 16 embracing the guide 6 so as to slide thereon and having a head 17 in its upper end that is directly supported upon the upper end of the coil spring. The head 17 preferably has a filling plug 18 to permit the insertion of lubricating oil through the head. Thus two hollow cylinders are constituted, one cylinder adapted to operate as a piston being movable in the other cylinder, so that an air-chamber is formed in which the coil spring is arranged, resulting in affording a pneumatic cushion in coöperation with a spring cushion to resist or absorb shocks thrust on either end of the coil-spring. The lower portion of the cylinder 16 is designed to carry lubricating oil, and it has pivot studs 19 and 20 on opposite sides thereof to which links 21 and 22 are connected respectively, the links carrying a pivot rod 23 connected with the eye 24 with which the leaf spring 4 is provided. In some cases fillers 25 and 26 are desired between the leaf spring and the links and preferably they are formed as bosses on the links.

For automatically lubricating the pivots 19 and 20 oilways 27 and 28 are made in the wall of the cylinder 16 to extend from the inner side of the wall to the under side of the pivots, respectively; and, to permit oil to pass to the oilways the guide 6 has ports 29 and 30 therein which are brought to the upper ends of the oilways when the guide is moved upward in operation. The cylinder 16 of the spring hanger has a lateral arm 31 thereon which has lateral ears 32 and 33 adjacent to the end of the arm which extends to the top of the leaf spring 4, and a yoke 34 embraces the leaf spring and extends through the ears, the yoke having hook heads 35 and 36 thereon engaging the ears, so that while the arm is secured to the leaf spring the spring may slip slightly in the yoke, permitting free action of the leaf spring while it enables the arm 31 to operate to maintain the coil spring in approximately upright position, or more particularly prevents the spring seat and connections from overturning from a proper supporting position on the pivot 10.

In order to obtain further control of the spring action which may be desired the controlling arm 31 preferably is provided with bosses 37 and 38 in suitable position on its sides from which pivots 39 and 40 extend, respectively, and a loop is provided which has stems 41 and 42 connected with the pivots respectively and also with a cross-bar 43, the loop extending downward to the axle and the cross-bar extending under the axle and usually in contact therewith.

In practical use, as the vehicle wheel rises and falls alternately on an uneven road the upward thrusts are resisted first by the coil spring and air compressed in the spring-chamber and subsequently if severe by the leaf spring without ordinarily causing an upward thrust on the frame part 5. The axle as it rises moves away from the cross-bar 43. As the vehicle wheel in operation suddenly falls into a depression and emerges therefrom the rebound which tends to suddenly force the middle of the leaf spring upward suddenly is counteracted by the action of the controlling arm 31 as its end is carried upward by the leaf spring, while the arm turns on its pivotal connection with the loop which engages the axle, thus placing pressure upon the top of the coil spring, the pneumatic cushion assisting in preventing sudden and harsh action of the coil spring. In case the spring seat moves downward as the axle suddenly descends after the vehicle wheel passes over an obstruction or drops into a depression, the axle pulls downward on the loop and consequently tends to draw the spring hanger downward so as to compress the coil spring and the air which leaks into the cylinder 16, resulting in smooth and easy riding of the vehicle body.

Having thus described the invention, what is claimed as new is—

1. A compound spring including a pivoted support, a coil spring seated on the support, a hanger movably guided by the support and supported upon and extending downward beyond the coil spring, means rigidly connected with the hanger to control pivotal movement of the support, and a leaf spring pivotally connected at its end with the hanger.

2. A compound spring including a cylindrical lubricant-carrying spring support having oilways in its side wall, a coil spring uprightly supported within the spring-support, a cylindrical hanger closely embracing the spring-support in sliding engagement therewith to constitute an air-chamber, the side wall of the hanger receiving lubricant from the oilways, the hanger having a head supported upon the coil spring, and a leaf spring supported by the hanger.

3. A compound spring including a leaf spring, a pivotally-supported coil spring, and a cylindrical hanger supported upon and inclosing the coil spring and bodily supporting an end portion of the leaf spring, the cylindrical hanger being provided with an arm rigid thereon and having loose shackled connection with the leaf spring distant from the supported end thereof.

4. A compound spring including two hollow relatively movable cylinders, one cylinder being in the other, each cylinder having a lateral controlling arm rigid thereon and having also a head fixed in its outer end, the head of the inner one of the cylinders being provided with ears having a supporting pivot, the outer one of the cylinders having two hanger pivots integral with the cylinder, and projecting from the outer side thereof, a coil spring arranged principally within the inner one of the cylinders and extending to the heads of the two cylinders, and links connected with the hanger pivots respectively.

5. A vehicle spring and mountings comprising a spring seat having a pivot to be supported on a vehicle axle, a coil spring supported upon the spring seat, a hollow cylindrical hanger supported upon the spring and having a lateral arm rigid thereon, the arm being provided with a yoke, links connected to the hanger, a leaf spring extending through the yoke and connected to the links, and a loop pivoted to the lateral arm and adapted to engage the bottom of the vehicle axle.

6. A vehicle spring and mountings therefor comprising a support, a spring seat pivoted on the support and having an upward-extending guide thereon, a coil spring supported upon the spring seat, a hollow cylinder extending about and guided by the guide on the spring seat, the cylinder having a head supported upon the coil spring and provided with a controlling arm rigid thereon, a pair of links having pivotal connection with the cylinder and provided with a pivot rod to support a leaf spring, and a device to connect the controlling arm loosely with the leaf spring.

7. In a vehicle spring and mountings therefor, the combination of a supporting pivot, a spring seat having two ears receiving said pivot and having also a cylindrical guide thereon, one of the ears having an oil-way therein extending from the top of said seat to said pivot, said guide having ports therein, a securing pin extending from the top of said seat and through said pivot and the other of said ears, a spring on said seat, a hanger cylinder supported on said spring and having hanger pivots on its lower portion, the wall of said cylinder having oil-ways extending to said hanger pivots, and links connected to the hanger pivots and provided with a pivot rod to support a leaf spring.

8. In a vehicle, the combination with a vehicle axle having an upstanding arm, and a leaf spring having an eye arranged adjacent to the arm, of a spring seat having ears pivoted to said arm and having also an upward-extending cylindrical guide, a hollow hanger cylinder extending about and guided on said guide and having a head in its upper portion, the outer side of the cylinder having a controlling arm and also two pivots thereon, a pair of links connected to the pivots respectively and also to said eye, a coil spring in the cylinder and supported upon the spring seat and supporting the head of said cylinder, a yoke connected to said arm and embracing the leaf spring, and a loop pivotally connected with said arm and embracing said axle.

In testimony whereof, I affix my signature in presence of two witnesses.

DALMAR T. BROWNLEE.

Witnesses:
E. T. Silvius,
F. M. Roeder.